US012392556B2

(12) United States Patent
Chen et al.

(10) Patent No.: US 12,392,556 B2
(45) Date of Patent: Aug. 19, 2025

(54) SHUTTLE KILN EXHAUST CONFIGURATION

(71) Applicant: CORNING INCORPORATED, Corning, NY (US)

(72) Inventors: Peng Chen, Pittsburgh, PA (US); Pravin Anant Rajeshirke, Pune (IN); Mayur Vitthal Selokar, Pune (IN); Michael James Vayansky, Elkland, PA (US)

(73) Assignee: CORNING INCORPORATED, Corning, NY (US)

( * ) Notice: Subject to any disclaimer, the term of this patent is extended or adjusted under 35 U.S.C. 154(b) by 900 days.

(21) Appl. No.: 17/624,370

(22) PCT Filed: Jun. 24, 2020

(86) PCT No.: PCT/US2020/039249

§ 371 (c)(1), (2) Date: Jan. 3, 2022

(87) PCT Pub. No.: WO2021/003044

PCT Pub. Date: Jan. 7, 2021

(65) Prior Publication Data

US 2022/0397347 A1 Dec. 15, 2022

Related U.S. Application Data

(60) Provisional application No. 62/870,231, filed on Jul. 3, 2019.

(51) Int. Cl.

| | |
|---|---|
| ***F27B 9/30*** | (2006.01) |
| ***F27B 9/26*** | (2006.01) |
| ***F27D 7/04*** | (2006.01) |
| ***F27D 17/30*** | (2025.01) |
| ***F28F 9/02*** | (2006.01) |
| ***F28F 13/08*** | (2006.01) |

(52) U.S. Cl.

CPC .............. *F27B 9/3005* (2013.01); *F27B 9/26* (2013.01); *F27B 9/30* (2013.01); *F27D 7/04* (2013.01);

(Continued)

(58) Field of Classification Search

CPC .. F27B 9/3005; F27B 9/26; F27B 9/30; F27B 2009/266; F27B 2009/268;

(Continued)

(56) References Cited

U.S. PATENT DOCUMENTS 1,779,964 A * 10/1930 Dreffein ................ F27B 9/3005 266/261
1,867,318 A 7/1932 Hull (Continued)

FOREIGN PATENT DOCUMENTS

CN 103924264 A 7/2014
CN 104677119 A 6/2015

(Continued)

OTHER PUBLICATIONS

DE-3834836-A1 translation (Year: 1990).*

(Continued)

*Primary Examiner* — Steven S Anderson, II
*Assistant Examiner* — Kurt Wolford
(74) *Attorney, Agent, or Firm* — Kevin M. Able

(57) ABSTRACT

A shuttle kiln (100) according to certain aspects includes at least one flue channel (124) and multiple flue risers (122) in fluid communication with the flue channel (124), and at least one shuttle (104) defining multiple exhaust shafts (140) arranged above the multiple flue risers (122), wherein an aggregate volume of a first exhaust shaft/riser pair (140-1, 122-1) differs from an aggregate volume of a second exhaust shaft/riser pair (140-2, 122-2). Such configuration at least partially compensates for different backpressures that would (Continued)

otherwise be experienced by flue gas exiting a shuttle kiln cavity (138) through different exhaust shafts (140), thereby improving uniformity of flue gas flow and reducing temperature variability within a kiln cavity (138).

19 Claims, 10 Drawing Sheets

(52) U.S. Cl.
CPC .......... *F27D 17/302* (2025.01); *F28F 9/0273* (2013.01); *F28F 13/08* (2013.01); *F27B 2009/266* (2013.01); *F27B 2009/268* (2013.01); *F27B 2009/3016* (2013.01); *F27B 2009/3066* (2013.01); *F27D 2007/045* (2013.01); *F28F 2009/029* (2013.01)

(58) Field of Classification Search
CPC ...... F27B 2009/3016; F27B 2009/3066; F27D 7/04; F27D 17/302; F27D 2007/045; F28F 9/0273; F28F 13/08; F28F 2009/029
See application file for complete search history.

(56) References Cited

U.S. PATENT DOCUMENTS

| | | | | |
|---|---|---|---|---|
| 9,776,922 | B2 | 10/2017 | Miyata et al. | |
| 2008/0116621 | A1* | 5/2008 | Brennan | F27B 9/10 432/142 |
| 2012/0240424 | A1 | 9/2012 | Sugihara et al. | |
| 2012/0279353 | A1 | 11/2012 | Englund et al. | |
| 2014/0011151 | A1* | 1/2014 | Miyata | C04B 38/0006 432/152 |

FOREIGN PATENT DOCUMENTS

| | | | | |
|---|---|---|---|---|
| CN | 103384807 | B | 1/2016 | |
| CN | 105603458 | A | 5/2016 | |
| CN | 108277022 | A | 7/2018 | |
| CN | 108507345 | A | 9/2018 | |
| DE | 3834836 | A1 * | 4/1990 | |
| EP | 2687802 | B1 | 3/2018 | |
| JP | 2007-001843 | A | 1/2007 | |
| WO | WO-2007023604 | A1 * | 3/2007 | B23K 1/008 |
| WO | 2007/116666 | A1 | 10/2007 | |

OTHER PUBLICATIONS

WO-2007023604-A1 translation (Year: 2007).*
McGill_the_fundamentals_of_duct_system_design.pdf(Year: 2003).*
International Search Report and Written Opinion of the International Searching Authority; PCT/US2020/039249; dated Aug. 14, 2020; pp. 13; European Patent Office.
Chinese Patent Application No. 202080049191.4 Office Action dated Sep. 20, 2023, 5 pages (English Translation only), Chinese Patent Office.

* cited by examiner

SHUTTLE KILN EXHAUST CONFIGURATION

CROSS-REFERENCE TO RELATED APPLICATION

This is a national stage application under 35 U.S.C. § 371 of International Application No. PCT/US2020/039249, filed on Jun. 24, 2020, which claims the benefit of priority under 35 U.S.C § 120 of U.S. Provisional Application Ser. No. 62/870,231 filed on Jul. 3, 2019, the content of which is relied upon and incorporated herein by reference in their entireties.

BACKGROUND

The disclosure relates to shuttle kilns for producing fired bodies, and more particularly to exhaust configurations providing enhanced temperature uniformity within shuttle kilns.

Shuttle kilns are typically used for batch processing of products (e.g., ceramics) at elevated temperatures. A shuttle kiln may include a kiln housing and one or more shuttles that in combination form a kiln cavity. Temperature variations in a kiln cavity (e.g., from a center an edge of the kiln cavity) can produce significant differences in the specifications and quality of fired products, depending on where a fired product was located within the kiln cavity during a firing process. Batch processing for sensitive applications may require increased temperature control and uniformity within the kiln cavity to provide consistent results and higher yields. For example, in certain applications, fired products (e.g., porous ceramic products containing organic matter) within a batch may exhibit different significant dimensional variation due to experience non-uniform part shrinkages in the firing process, based on exposure of the products to different maximum temperatures depending on where the products were located within a kiln cavity.

One such potential source of temperature variation within a kiln cavity is non-uniform flow of flue gas exiting the kiln cavity due to asymmetric location of an exhaust fan relative to flue risers and/or exhaust shafts of kiln cars. Need therefore exists in the art for shuttle kiln exhaust systems that address limitations associated with conventional systems.

SUMMARY

A shuttle kiln according to certain aspects includes at least one flue channel and multiple flue risers in fluid communication with the flue channel, and at least one shuttle defining multiple exhaust shafts arranged above the multiple flue risers, wherein an aggregate volume of a first flue channel/riser pair differs from an aggregate volume of a second flue channel/riser pair. Such configuration at least partially compensates for different backpressures that would otherwise be experienced by flue gas exiting a shuttle kiln cavity through different exhaust shafts, thereby improving uniformity of flue gas flow and reducing temperature variability within a kiln cavity.

In one aspect, the present disclosure relates to a shuttle kiln including a kiln housing and at least one shuttle positioned within the kiln housing. The kiln housing includes a first flue channel and a first plurality of flue risers in fluid communication with the first flue channel. The first plurality of flue risers includes a first flue riser defining a first riser volume and a second flue riser defining a second riser volume. The at least one shuttle defines a first plurality of exhaust shafts including a first exhaust shaft defining a first shaft volume and a second exhaust shaft defining a second shaft volume. The first exhaust shaft is arranged above and in fluid communication with the first flue riser. The first exhaust shaft is separated from the first flue riser to define a first entrainment gap therebetween. The second exhaust shaft is arranged above and in fluid communication with the second flue riser. The second exhaust shaft being separated from the second flue riser to define a second entrainment gap therebetween. A sum of the first riser volume and the first shaft volume is less than a sum of the second riser volume and the second shaft volume.

In certain embodiments, the kiln housing includes a floor, a door, sidewalls, and a ceiling bounding an interior. The first flue channel is arranged below a top surface of the floor. The first plurality of flue risers extend above the top surface of the floor. In certain embodiments, the kiln housing further includes a second flue channel and a second plurality of flue risers in fluid communication with the second flue channel. In certain embodiments, the kiln housing further includes an exhaust fan in fluid communication with the first flue channel, and the first flue riser is closer than the second flue riser to the exhaust fan.

In certain embodiments, the at least one shuttle includes a plurality of shuttles. In certain embodiments, a first shuttle of the plurality of shuttles includes the first exhaust shaft, and a second shuttle of the plurality of shuttles includes the second exhaust shaft. In certain embodiments, the first plurality of flue risers further includes a third flue riser defining a third riser volume, and the first plurality of exhaust shafts further includes a third exhaust shaft defining a third shaft volume. The third exhaust shaft is arranged above and in fluid communication with the third flue riser. The third exhaust shaft separated from the third flue riser to define a third entrainment gap therebetween. A sum of the second riser volume and the second shaft volume is less than a sum of the third riser volume and the third shaft volume. In certain embodiments, at least a portion of the first exhaust shaft is vertically aligned with the first flue riser, and at least a portion of the second exhaust shaft is vertically aligned with the second flue riser. In certain embodiments, a cross-sectional area of the first flue riser is in a range of from 0.09 $m^2$ to 0.21 $m^2$, and a cross-sectional area of the first exhaust shaft is in a range of from 0.09 $m^2$ to 0.21 $m^2$.

In certain embodiments, a height of the first flue riser is less than a height of the second flue riser. In certain embodiments, a height of the first exhaust shaft is less than a height of the second exhaust shaft. In certain embodiments, the height of the first flue riser is less than the height of the second flue riser, and the height of the first exhaust shaft is less than the height of the second exhaust shaft. In certain embodiments, the first entrainment gap is larger than the second entrainment gap. In certain embodiments, a cross-sectional area of the first flue riser is less than a cross-sectional area of the second flue riser. In certain embodiments, a cross-sectional area of the first exhaust shaft is less than a cross-sectional area of the second exhaust shaft. In certain embodiments, the cross-sectional area of the first flue riser is less than the cross-sectional area of the second flue riser, and the cross-sectional area of the first exhaust shaft is less than the cross-sectional area of the second exhaust shaft.

In another aspect, the present disclosure relates to a shuttle kiln including a kiln housing. The kiln housing includes a flue channel and a plurality of flue risers in fluidic communication with the flue channel. The plurality of flue risers includes a first flue riser defining a first riser volume and a second flue riser defining a second riser volume that differs from the first riser volume. The first flue riser is configured to be arranged below a first exhaust shaft of a shuttle when the shuttle is positioned within the kiln housing. The second flue riser is configured to be arranged below a second exhaust shaft of the shuttle when the shuttle is positioned within the kiln housing.

In another aspect, the present disclosure relates to a shuttle kiln including at least one shuttle. The at least one shuttle is configured to be removably positioned within a kiln housing. The at least one shuttle defining a plurality of exhaust shafts including a first exhaust shaft defining a first shaft volume and a second exhaust shaft defining a second shaft volume that differs from the first shaft volume. The first exhaust shaft is configured to be arranged above a first flue riser of the kiln housing when the at least one shuttle is positioned within the kiln housing. The second exhaust shaft is configured to be arranged above a second flue riser of the kiln housing when the at least one shuttle is positioned within the kiln housing.

In another aspect, the present disclosure relates to a method of fabricating at least one fired body. The method includes moving at least one shuttle carrying at least one unfired body into a kiln housing of a shuttle kiln, the kiln housing including a first flue riser and a second flue riser. The method further includes arranging a first exhaust shaft of the at least one shuttle above the first flue riser and arranging a second exhaust shaft of the at least one shuttle above the second flue riser, wherein a sum of a first riser volume of the first flue riser and a first shaft volume of the first exhaust shaft is less than a sum of a second riser volume of the second flue riser and a second shaft volume of the second exhaust shaft. The method further includes heating a kiln cavity bounded by the at least one shuttle and the kiln housing to alter the at least one unfired body. The method further includes exhausting gas from the kiln cavity through a first flow path and a second flow path, wherein the first flow path extends through the first exhaust shaft, across a first entrainment gap, and through the first flue riser to a first flue channel, and wherein the second flow path extends through the second exhaust shaft, across a second entrainment gap, and through the second flue riser to the first flue channel.

In certain embodiments, the present disclosure relates to a fired body is produced by the foregoing method.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
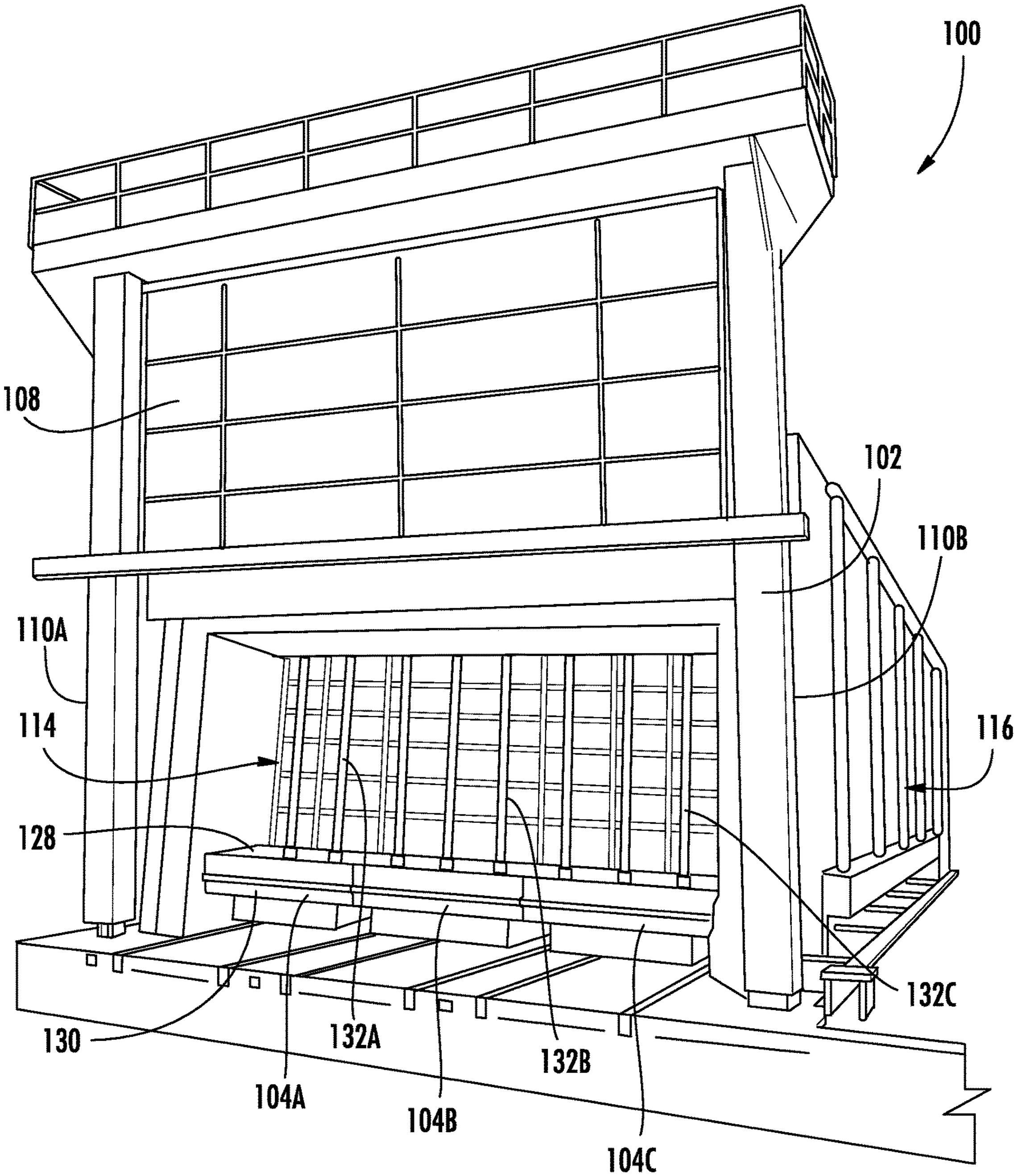
FIG. 1A is a perspective view of a shuttle kiln including a kiln housing and multiple shuttles positioned therein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term “and/or” includes any and all combinations of one or more of the associated listed items.

Relative terms such as “below” or “above” or “upper” or “lower” or “horizontal” or “vertical” may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIGS. 1A-1D are views of a shuttle kiln 100 including a kiln housing 102 and a first shuttle 104A, a second shuttle 104B, and a third shuttle 104C (referred to generally herein as shuttles 104) positioned therein. In certain embodiments, more or fewer shuttles 104 (may also be referred to herein as shuttle cars, kiln cars, kiln carts, etc.) may be used. A shuttle kiln 100 is a type of periodic kiln configured to uniformly heat a kiln cavity 138 bounded in part by the kiln housing 102 to a kiln peak temperature (may also be referred to as a maximum temperature, peak temperature, etc.). The features described herein and below may be applied to other types of periodic kilns.

Figure 1B:
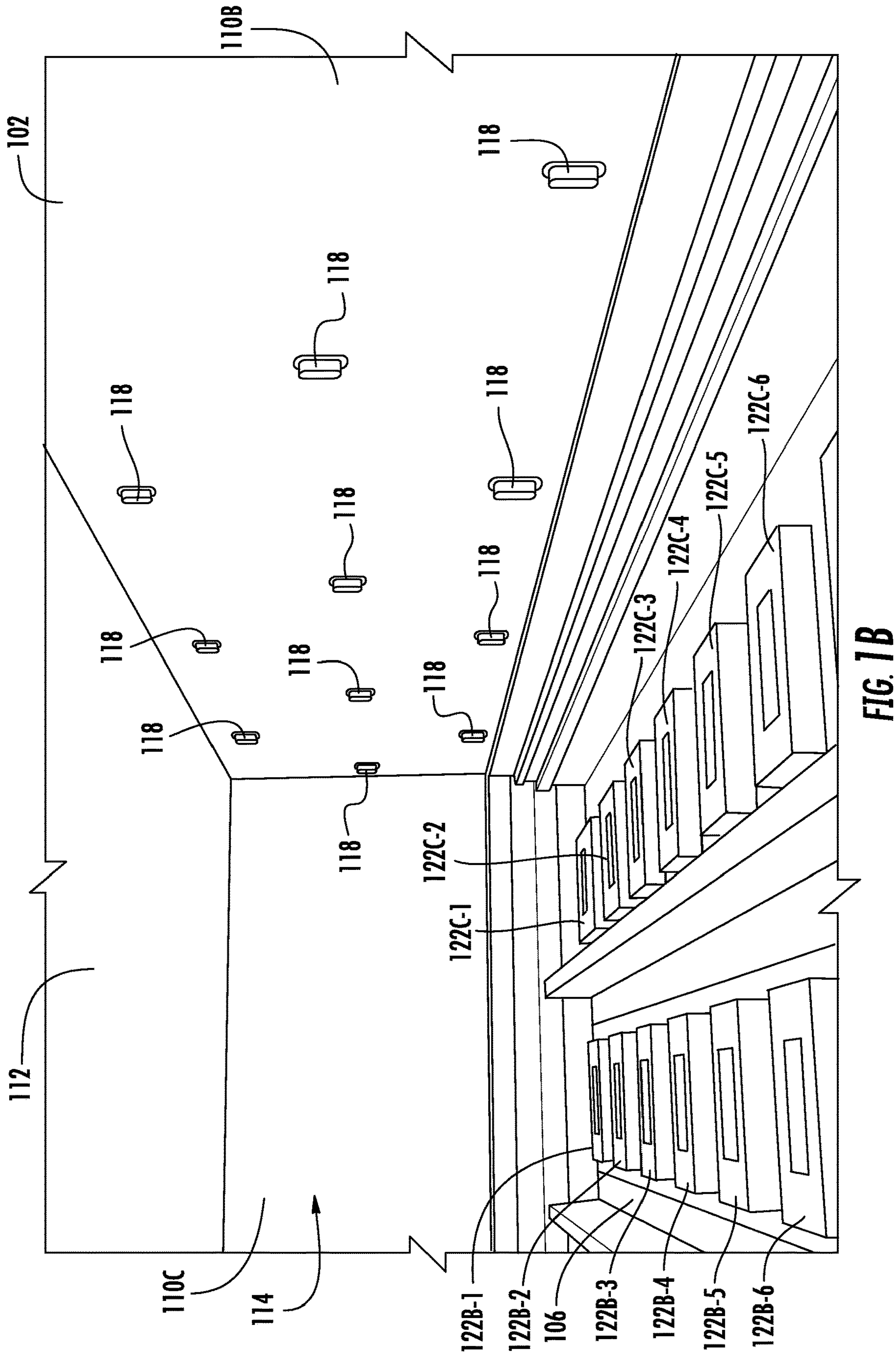
FIG. 1B is a perspective view of an interior of the kiln housing of FIG. 1A.

Referring to FIGS. 1A and 1B, the kiln housing 102 includes a floor 106, a front door 108, a left sidewall 110A, a right sidewall 110B (opposite the left sidewall 110A), a back sidewall 110C (wherein the foregoing left, right, and back sidewalls 110A-110C may be referred to generally herein as sidewalls 110), and a ceiling 112, which bound and define an interior 114 of the kiln housing 102. As shown in FIG. 1A, each shuttle 104A-104C includes a top 128 and a bottom 130 (opposite the top 128). When the shuttles 104 are positioned within the kiln housing 102 and the front door 108 is in the closed position, a kiln cavity 138 is defined between the front door 108, the sidewalls 110, and the ceiling 112 of the kiln housing 102 as well as the top 128 of the shuttle 104. The top 128 of the shuttle 104 serves as a moveable refractory floor that is used as a hearth of the shuttle kiln 100.

The front door 108 of the kiln housing 102 is moveable from a closed position enclosing the interior 114 to an open position allowing insertion of shuttles 104 into, and/or removal of the shuttles 104 from, the interior 114 of the kiln housing 102. The shuttles 104 are configured to carry unfired bodies into the interior 114 of the kiln housing 102 and carry fired bodies out of the interior 114 of the kiln housing 102 (e.g., through the front door 108). In certain embodiments, the kiln housing 102 includes a back door (as well as a front door 108).

The shuttle kiln 100 includes a firing system 116 to heat the kiln cavity 138. The firing system 116 includes a plurality of burners 118 that extend through the left sidewall 110A and right sidewall 110B to heat the kiln cavity 138. In certain embodiments, the plurality of burners 118 may additionally, or alternatively, extend through the ceiling 112. The front door 108, sidewalls 110, and ceiling 112 each include refractory interior surfaces to retain heat produced by the plurality of burners 118 within the kiln cavity 138. The plurality of burners 118 produce hot gas (which may also be referred to herein as flue gas) in the kiln cavity 138.

Figure 1C:
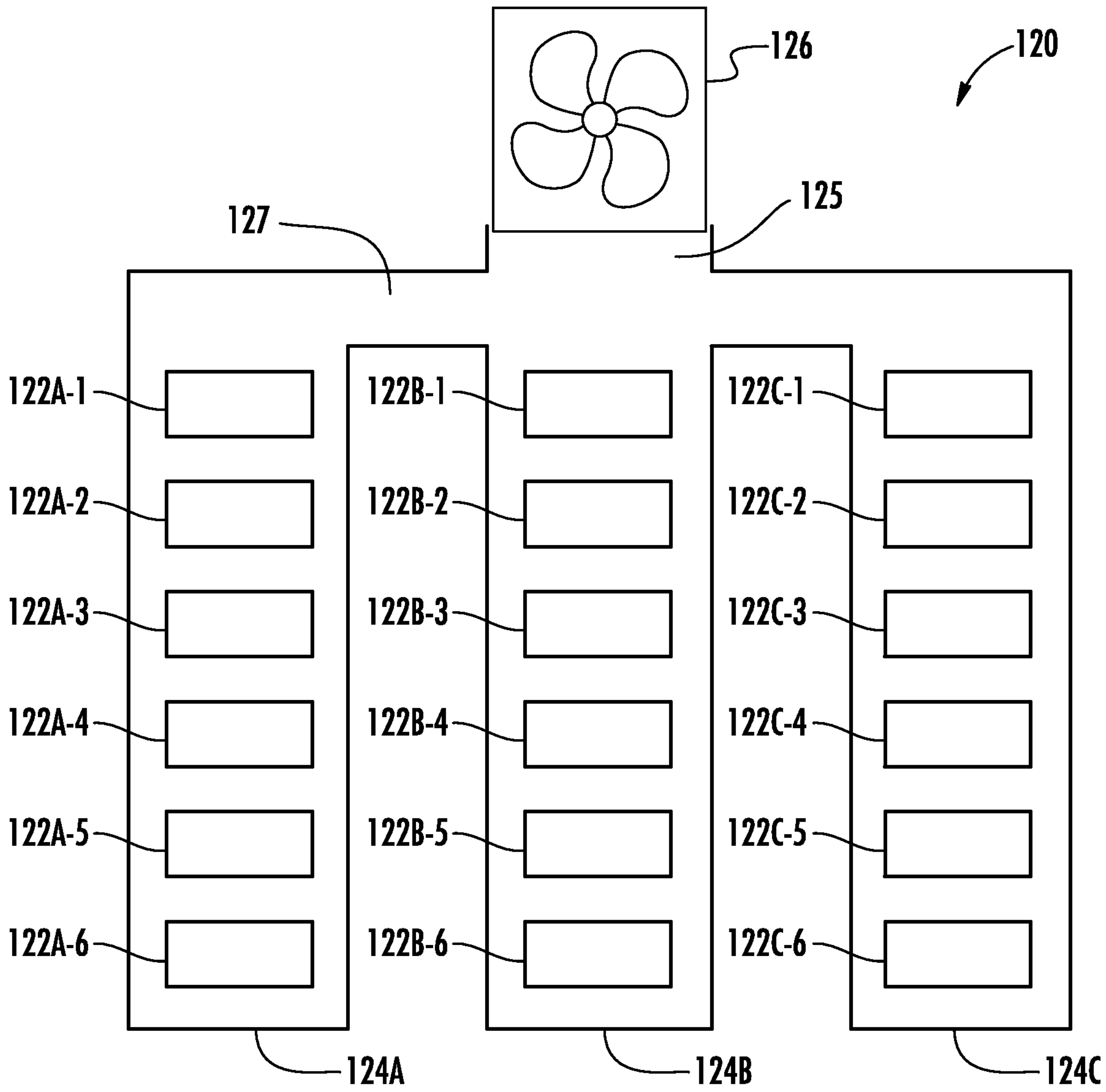
FIG. 1C is a schematic top view of an exhaust system of the shuttle kiln of FIG. 1A including flue channels and an exhaust fan.

Referring to FIGS. 1B and 1C, the shuttle kiln 100 includes an exhaust system 120 to exhaust the hot gas (e.g., flue gas) from the kiln cavity 138. The exhaust system 120 includes a plurality of flue risers 122 extending upward from a top surface of the floor 106 of the kiln housing 102, with the plurality of flue risers 122 being in fluid communication with a plurality of flue channels 124 arranged below a top surface of the floor 106. The flue risers 122 include a first plurality of flue risers 122A in fluid communication with a first flue channel 124A (proximate the left sidewall 110A), a second plurality of flue risers 122B in fluid communication with a second flue channel 124B, and a third plurality of flue risers 122C in fluid communication with a third flue channel 124C (proximate the right sidewall 110B). The second plurality of flue risers 122B and the second flue channel 124B are laterally positioned between the first and third plurality of flue risers 122A, 122C and the first and third flue channels 124A, 124C. In certain embodiments, fewer or more flue risers 122 and/or flue channels 124 may be used. As shown in FIG. 1C, the flue channels 124 each lead to a header duct 127 that is arranged to collect fluid gas and supply the flue gas to a fan inlet duct 125.

An exhaust fan 126 associated with the kiln housing 102 receives flue gas supplied from the flue channels 124 to the fan inlet duct 125. The exhaust fan 126 pulls flue gas from the kiln cavity 138 through the flue risers 122, the flue channels 124, the header duct 127, and the fan inlet duct 125. As illustrated, the exhaust fan 126 may be positioned proximate to the second flue channel 124B and proximate to the back sidewall 110C. In certain embodiments, additional exhaust fans 126 may be used. Further, in certain embodiments, one or more exhaust fans may be positioned proximate to the first flue channel 124A and/or the third flue channel 124C. In each flue channel 124A-124C, individual flue risers 122 are arranged at different distances relative to the exhaust fan 126. For example, in each flue channel 124A-124C the respective first flue riser 122A-1, 122B-1, 122C-1 is closer to the exhaust fan 126 than the respective second flue riser 122A-2, 122B-2, 122C-2, etc.

Figure 1D:
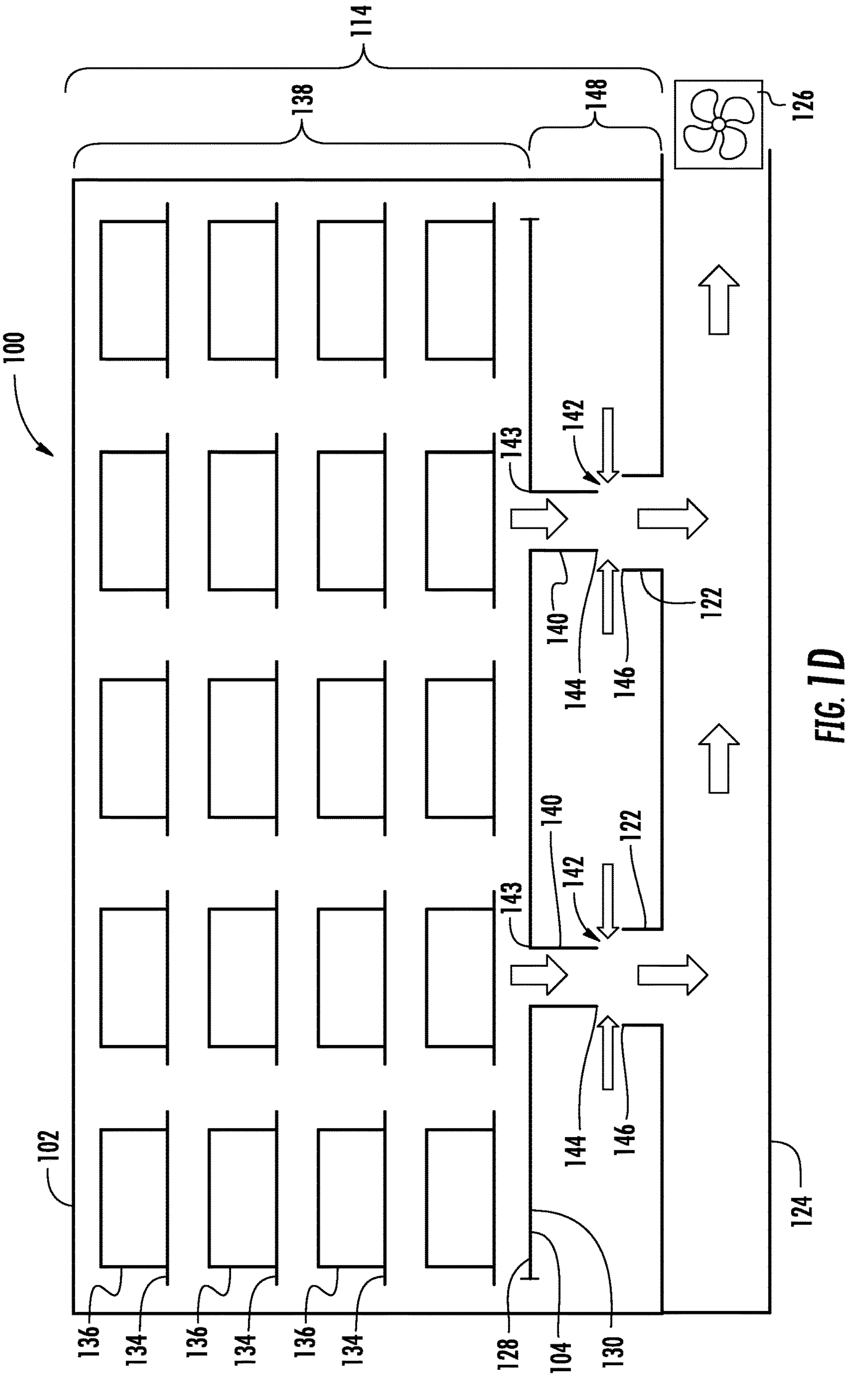
FIG. 1D is a schematic side view of the shuttle kiln of FIG. 1A including exhaust ports of the shuttle in fluid communication with flue risers of the kiln housing.

Referring to FIGS. 1A and 1D, each shuttle 104 is configured to carry furniture 132 positioned on the shuttle 104. In certain embodiments, the first shuttle 104A carries first furniture 132A, the second shuttle 104B carries second furniture 132B, and the third shuttle 104C carries third furniture 132C. The furniture 132 defines a plurality of support surfaces 134 configured to support a plurality of bodies 136 (e.g., unfired bodies prior to firing, fired bodies after firing, etc.). In certain embodiments, the furniture 132 may resemble shelving units, with upstanding columns or posts supporting multiple shelf-like support surfaces 134 arranged at different heights.

Each shuttle 104 includes a plurality of exhaust shafts 140 (which may also be referred to herein as offtakes) that extend from the top 128 to the bottom 130 of the shuttles 104. The exhaust shafts 140 extend through the shuttle 104 to exhaust hot gas from the kiln cavity 138 above the shuttle 104 to the flue risers 122 below the shuttle 104. When the shuttle 104 is positioned within the interior 114 of the kiln housing 102, each exhaust shaft 140 is arranged above and in fluid communication with a respective one of the plurality of flue risers 122, and each exhaust shaft 140 is vertically aligned with at least a portion of one of the plurality of flue risers 122. In other words, when the shuttle 104 is positioned within the interior 114 of the kiln housing 102, at least a portion of each flue riser 122 is arranged below a respective exhaust shaft of the shuttle 104. In certain embodiments, the first shuttle 104A includes a first plurality of exhaust shafts 140 that align with the first plurality of flue risers 122A (which are in fluid communication with the first flue channel 124A), the second shuttle 104B includes a second plurality of exhaust shafts 140 that align with the second plurality of flue risers 122B (which are in fluid communication with the second flue channel 124B), and the third shuttle 104C includes a third plurality of exhaust shafts 140 that align with the third plurality of flue risers 122C (which are in fluid communication with the third flue channel 124C). In certain embodiments, exhaust shafts of multiple shuttles 104 (with the shuttles arrange front to back) may be aligned with flue risers 122 associated with one flue channel 124. For example, in certain embodiments, an exhaust shaft 140 of a first shuttle 104 may be aligned with a first flue riser 122A-1 of the first flue channel 124A and an exhaust shaft 140 of a second shuttle 104 may be aligned with a seventh flue riser 122A-7 of the first flue channel 124A.

The exhaust shafts 140 are vertically aligned with at least portions of the flue risers 122 to place the exhaust shafts 140 in fluid communication with the flue risers 122. Restated, at least a portion of each exhaust shaft 140 may be vertically aligned with a respective one of the flue risers 122. As the shuttle 104 is movable relative to the floor 106 of the kiln housing 102 (and relative to the flue risers 122), the exhaust shafts 140 are not directly attached to the flue risers 122. The exhaust shafts 140 each include an inlet port 143 at the top 128 of the shuttle 104, and an outlet port 144 at the bottom 130 of the shuttle 104. In each instance, the outlet port 144 is arranged below the inlet port 143. Entrainment gaps 142 are defined between outlet ports 144 of the exhaust shafts 140 (at a bottom of each exhaust shaft 140) and inlet ports 146 of the flue risers 122 (at a top of each flue riser 122). In other words, each exhaust shaft 140 is configured to be separated from a corresponding flue riser 122 with an entrainment gap 142 arranged therebetween. As the top 128 of the shuttle 104 has a refractory surface configured to reflect heat upward, cooler gas (e.g., undercar gas or undercar air) in the undercar space 148 beneath the shuttle 104 and above the floor 106 is cooler than the hot gas in the kiln cavity 138 above the shuttle 104. As flue gas exhausts from the exhaust shaft 140 to the flue riser 122, cooler gas is drawn through the entrainment gap 142 into the flue riser 122, due to suction generated by the exhaust fan 126. The cooler gas in the undercar space 148 mixes with and cools the hot gas entering the flue channel 124. In certain embodiments, the exhaust fan 126 is configured to handle gas at a maximum operating temperature, and the cooler gas pulled through the entrainment gap 142 is used to cool the hot gas from the exhaust shaft 140 to a temperature below the maximum operating temperature. The temperature of the gas inside the flue channel 124 is lower than the temperature of the hot gas in the exhaust shafts 140 due to the addition of cooler gas through the entrainment gap 142.

Referring to FIG. 1C, the position of the exhaust fan 126 relative to the flue risers 122 and/or relative to the flue channels 124 is asymmetric. The exhaust fan 126 is closer to the first flue riser 122A-1 than the second flue riser 122A-2. Additionally, the exhaust fan 126 is closer to the second flue channel 124B than to each of the first flue channel 124A and the third flue channel 124C. If the exhaust shafts 140 and/or flue risers 122 all have the same volume (e.g., height and width) relative to one another, this can create non-uniform flow of flue gas through the exhaust shafts 140. In other words, the first flue riser 122A-1 is closer to the exhaust fan 126 than the second flue riser 122A-2. As a result, backpressure at the first exhaust shaft 140-1 (in communication with the first flue riser 122A-1) is lower than the second exhaust shaft 140-2 (in communication with the second flue riser 122A-2). Differences in backpressure create non-uniform flow of the cooler gas into the flue risers 122. As the cooler gas beneath the shuttle 104 is colder than the hot gas above the shuttle 104, this can create non-uniform temperatures within the kiln cavity 138. In certain embodiments, multiple exhaust fans 126 may be used (e.g., one for each flue channel 124), which may help reduce (but not eliminate) the flow asymmetry. However, multiple exhaust fans 126 may not be practical, due to increased cost in producing and/or operating the shuttle kiln 100.

Figure 2A:
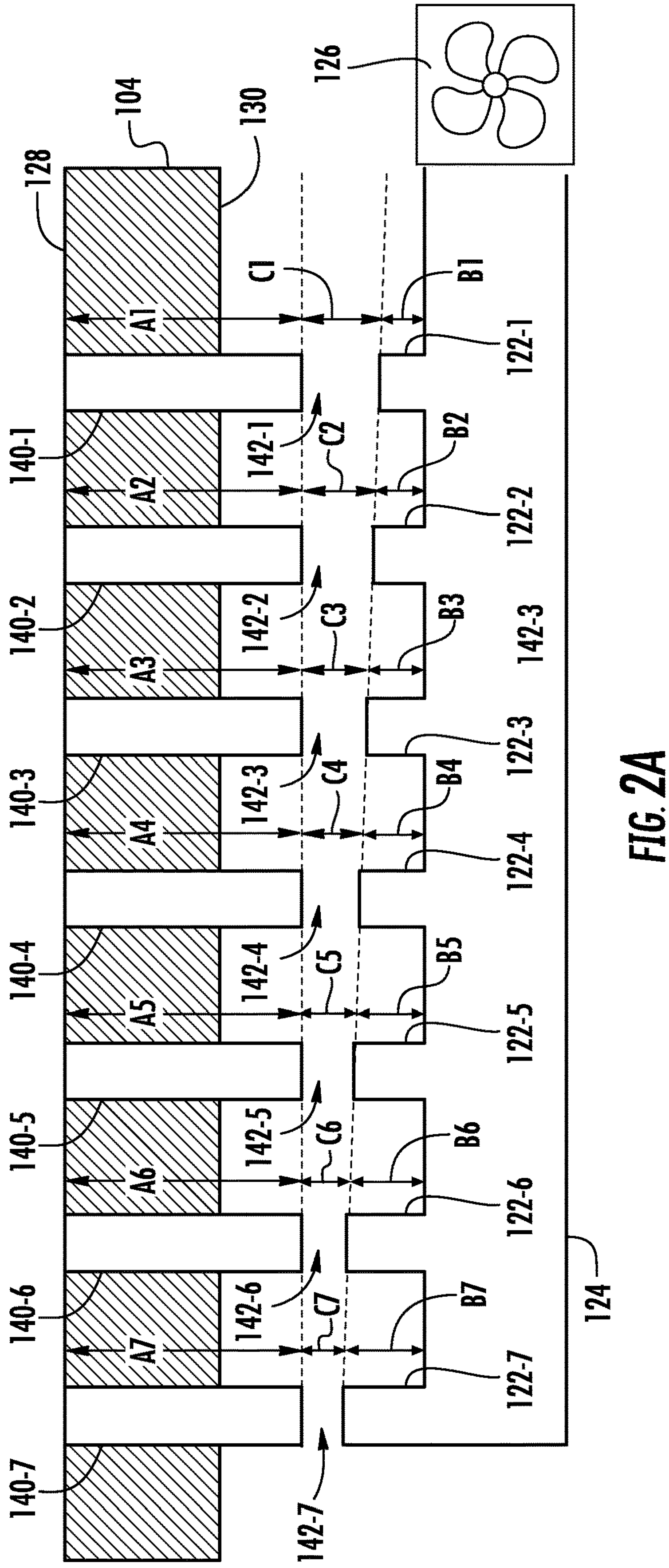
FIG. 2A is a schematic side view of one embodiment of the shuttle kiln with different flue risers of the kiln housing of FIG. 1A having different heights.
Figure 2B:
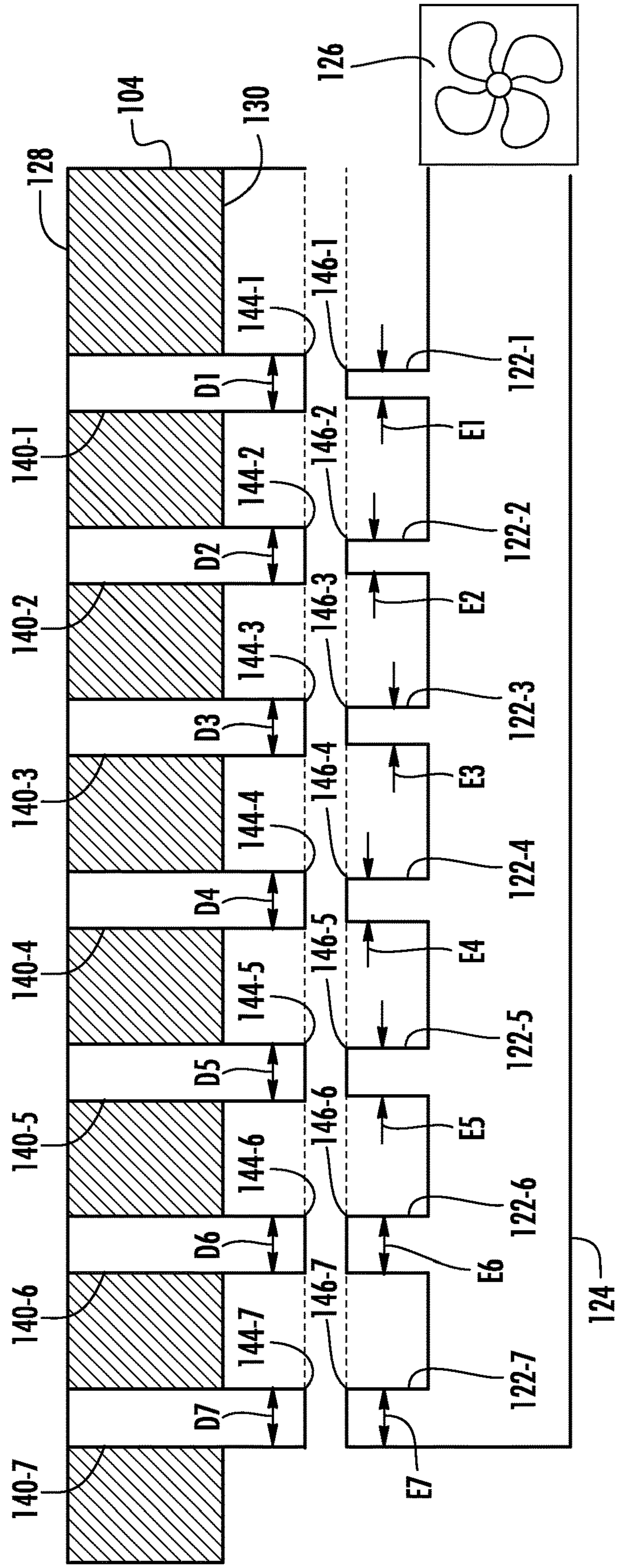
FIG. 2B is a schematic side view of one embodiment of the shuttle kiln with different flue risers of the kiln housing of FIG. 1A having different widths.
Figure 2C:
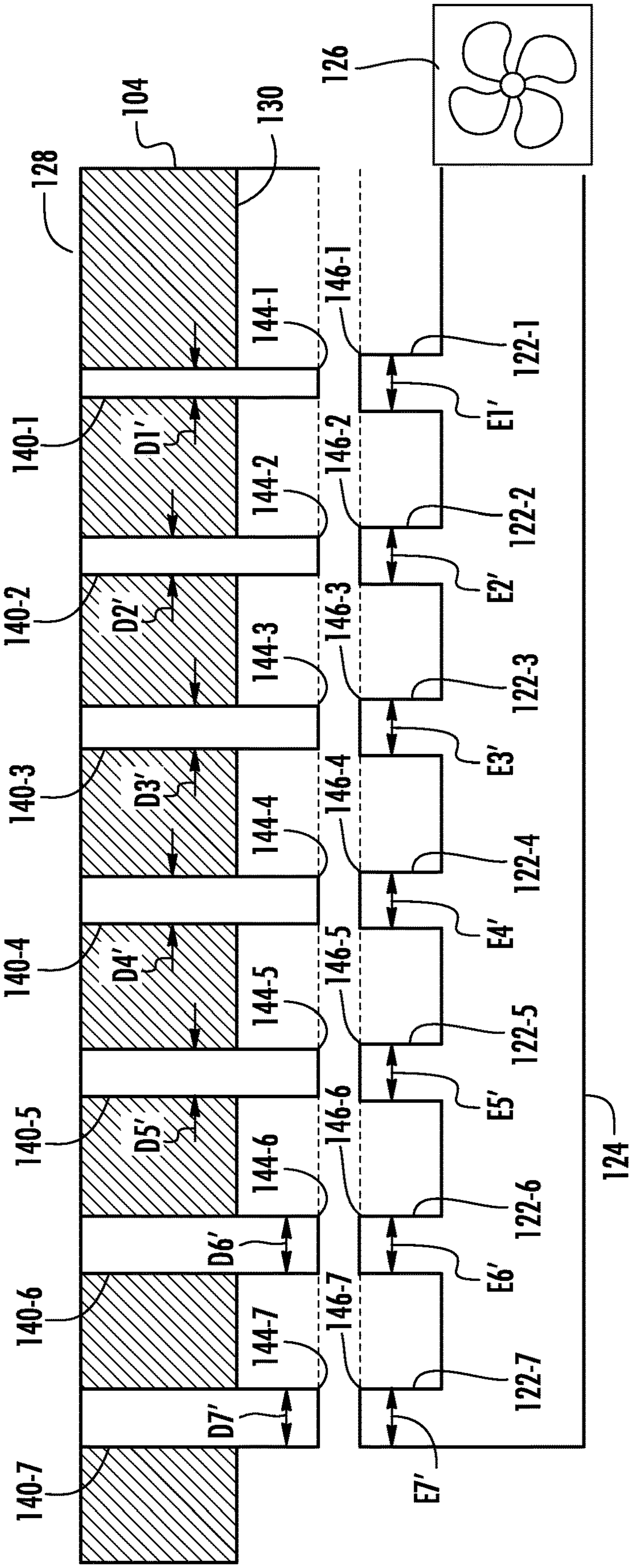
FIG. 2C is a schematic side view of one embodiment of the shuttle kiln with different exhaust shafts of the shuttle of FIG. 1A having different widths.

FIGS. 2A-2C are views of embodiments of the shuttle kiln 100 with flue risers 122 of the kiln housing 102 and/or exhaust shafts 140 of the shuttle 104 including different volumes (e.g., height and/or cross-sectional area, etc.) and/or different entrainment gaps 142. A sum of a first riser volume of a first flue riser 122-1 (closer to the exhaust fan 126) and a first shaft volume of a first exhaust shaft 140-1 (closer to the exhaust fan 126) is less than a sum of a second flue riser volume 122-2 (farther from the exhaust fan 126) and a second shaft volume of the second exhaust shaft 140-2 (farther from the exhaust fan 126). Providing exhausts (i.e., flue risers 122 and/or exhaust shafts 140) with different characteristics (e.g., sizes) may at least partially mitigate backpressure differences through different exhaust flow paths, thereby providing more uniform flow from the exhaust shafts 140 and concomitantly provide more uniform temperature within the kiln cavity 138. In certain embodiments, the volume of each flue riser 122 increases from the first flue riser 122-1 to the seventh flue riser 122-7, the size of the entrainment gap 142 decreases from the first entrainment gap 142-1 to the seventh entrainment gap 142-7, and/or the volume of each exhaust shaft 140 increases from the first exhaust shaft 140-1 to the seventh exhaust shaft 140-7. As flue gas exhausts from each exhaust shaft 140 to a corresponding flue riser 122, cooler gas is pulled through the entrainment gap 142. The amount of cooler gas supplied to each flue riser 122 may depend on the size of the entrainment gaps 142 and/or size of the volumes (e.g., height and/or cross-sectional area, etc.) of the exhaust shafts 140 and/or flue risers 122.

The amount of cooler gas (e.g., undercar gas, undercar air) drawn through the entrainment gaps 142 from the undercar space 148 beneath the shuttle 104 that is mixed with the hot gas from the kiln cavity 138 above the shuttle 104 affects the temperature and flammability of flue gas in the flue channel 124. The shuttle kiln 100 disclosed herein may provide more control over exhaust flow uniformity, gas temperature in the flue channel 124, gas flammability in the flue channel 124, and/or scavenging efficiency of the gas from the kiln housing 102. In certain embodiments, an exhaust configuration disclosed herein may be achieved solely by adjusting dimensions (e.g., height, width, volume, etc.) of flue risers 122 of a shuttle kiln 100, thereby enabling the benefits described herein to be achieved with interchangeable (e.g., identical) shuttles 104 placed at any position within a kiln housing 102. In certain embodiments, an existing shuttle kiln may be retrofitted with minimal hardware changes to include one or more exhaust configurations as disclosed herein.

FIG. 2A illustrates flue risers 122 including different volumes defined at least partly by different heights and entrainment gaps 142. The height A of each exhaust shaft 140 is uniform. However, the height B differs for different flue risers 122 and/or the depth C for different entrainment gaps 142 are different. The first flue riser 122-1 closest to the exhaust fan 126 has a first volume defined in part by a first height B1, which is the smallest height of the flue risers 122. Similarly, a depth C1 of the first entrainment gap 142-1 between the first flue riser 122-1 and the first exhaust shaft 140-1 is the largest among the multiple entrainment gaps 142. The seventh flue riser 122-7 farthest from the exhaust fan 126 has a seventh volume defined in part by a seventh height B7, which is the largest height of the flue risers 122. Similarly, a depth C7 of the seventh entrainment gap 142-7 between the seventh flue riser 122-7 and the seventh exhaust shaft 140-7 is the smallest among the multiple entrainment gaps 142. Accordingly, the height of each flue riser 122 increases from the first flue riser 122-1 to the seventh flue riser 122-7, and/or the size of the entrainment gap 142 decreases from the first entrainment gap 142-1 to the seventh entrainment gap 142-7.

In such a configuration, the shuttles 104 do not require modification. As a result, the design can easily be retrofitted to existing shuttles kilns 100 without major modifications. Although the heights A of the exhaust shafts 140 are uniform, in certain embodiments, the heights A of the exhaust shafts 140 could be different in addition to, or instead of, providing flue risers 122 of different heights B. In this case, the heights A of the exhaust shafts 140 would increase from the first exhaust shaft 140-1 to the seventh exhaust shaft 140-7.

FIG. 2B illustrates flue risers 122 including different volumes defined at least partly by different cross-sectional areas (e.g., as a function of differing width). The width D of each exhaust shaft 140 (and/or each outlet port 144) is uniform. However, the width E of each flue riser 122 (and/or each inlet port 146) differs relative to one another. The first flue riser 122-1 closest to the exhaust fan 126 has a first volume defined in part by a first width E1, which is the smallest width of the flue risers 122. The seventh flue riser 122-7 farthest from the exhaust fan 126 has a seventh volume defined in part by a seventh width E7, which is the largest width of the flue risers 122. Accordingly, the size of each flue riser 122 increases from the first flue riser 122-1 to the seventh flue riser 122-7.

FIG. 2C illustrates the exhaust shafts 140 include different volumes defined at least partly by different sized cross-sectional areas (as a function of differing width). The width E' of the flue risers 122 (and/or inlet port 146) are uniform. The width D' (and/or outlet port 144) of the exhaust shafts 140 are different. The first exhaust shaft 140-1 closest to the exhaust fan 126 has a first volume defined in part by a first width D1, which is the smallest width of the exhaust shafts 140. The seventh exhaust shaft 140-7 farthest from the exhaust fan 126 has a seventh volume defined in part by a seventh width D7', which is the largest width of the exhaust shafts 140. Accordingly, the size of each exhaust shaft 140 increases from the first exhaust shaft 140-1 to the seventh exhaust shaft 140-7.

It is noted that the volume of the exhaust shafts 140 and/or the flue risers 122 can be varied as a function of height, cross-sectional area (e.g., width), and/or depth of the entrainment gap 142, individually or in combination. In other words, the features of FIGS. 2A-2C are compatible with and may be combined with one another. In certain embodiments, the cross-sectional area of each flue riser 122 is in a range of from 0.09 $m^2$ to 0.21 $m^2$ and/or the cross-sectional area of each exhaust shaft 140 is in a range of from 0.09 $m^2$ to 0.21 $m^2$.

FIGS. 3A-3D and FIG. 4 illustrate the effects of increasing the size of the entrainment gaps 142 between exhaust shafts 140 of the shuttle 104 and flue risers of the kiln housing 102. In certain embodiments, extreme scenarios were considered, in which the kiln cavity 138 had a temperature of 1400° C., 5 Pa, and/or 3% oxygen concentration, an undercar space 148 had a temperature of 50° C., 0 Pa, and/or 23% oxygen concentration, and/or a flue channel 124 pressure of −100 Pa.

Figure 3A:
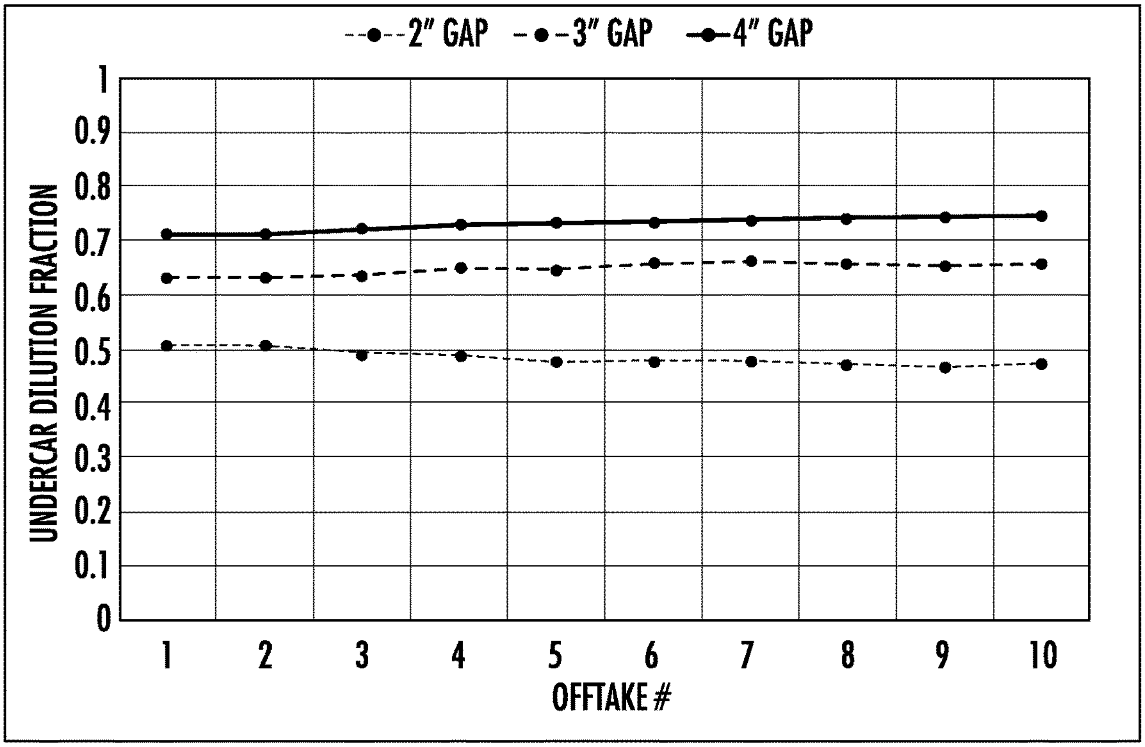
FIG. 3A is a chart illustrating the effect on undercar dilution fraction by increasing the size of an entrainment gap between exhaust shafts of the shuttle and flue risers of the kiln housing.

FIG. 3A is a chart illustrating the effect on undercar dilution fraction by increasing the size of an entrainment gap 142 between exhaust shafts 140 of the shuttle 104 and flue risers 122 of the kiln housing 102. The undercar dilution fraction is the ratio of hot gas (from within the kiln cavity 138) to cool gas (from undercar space 148). As shown, as the entrainment gap 142 increases, the undercar dilution fraction increases for every exhaust shaft 140 (i.e., offtake). A greater entrainment gap 142 means that more cool gas is pulled into the flue risers 122 and flue channel 124. It is further noted that increasing the entrainment gap 142 also increases the overall flow through the flue channel 124, which thereby increases the operating load on the exhaust fan 126.

Figure 3B:
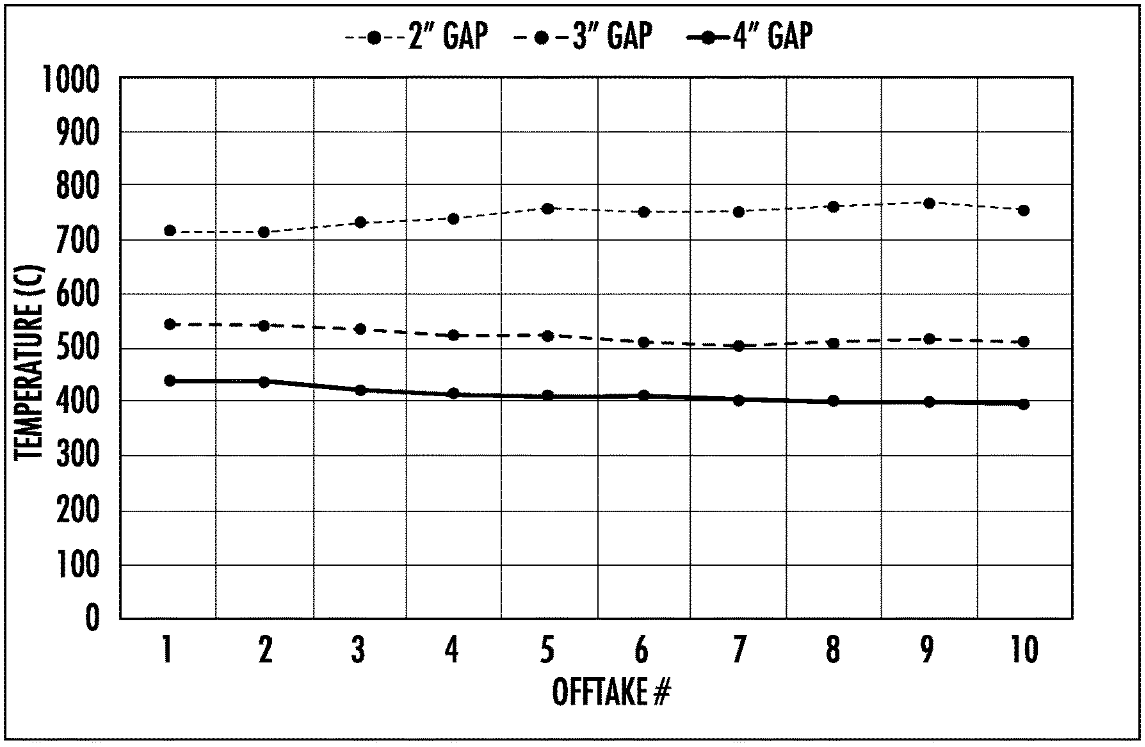
FIG. 3B is a chart illustrating the effect on temperature by increasing the size of an entrainment gap between exhaust shafts of the shuttle and flue risers of the kiln housing.

FIG. 3B is a chart illustrating the effect on temperature by increasing the size of an entrainment gap 142 between exhaust shafts 140 of the shuttle 104 and flue risers 122 of the kiln housing 102. As shown, as the entrainment gap 142 increases, the temperature decreases for every exhaust shaft 140 (i.e., offtake). A greater entrainment gap 142 means that more cool gas is pulled into the flue risers 122 and flue channel 124. As noted above, in certain embodiments, these cooler gas temperatures may be necessary for reliable operation of the exhaust fan 126.

Figure 3C:
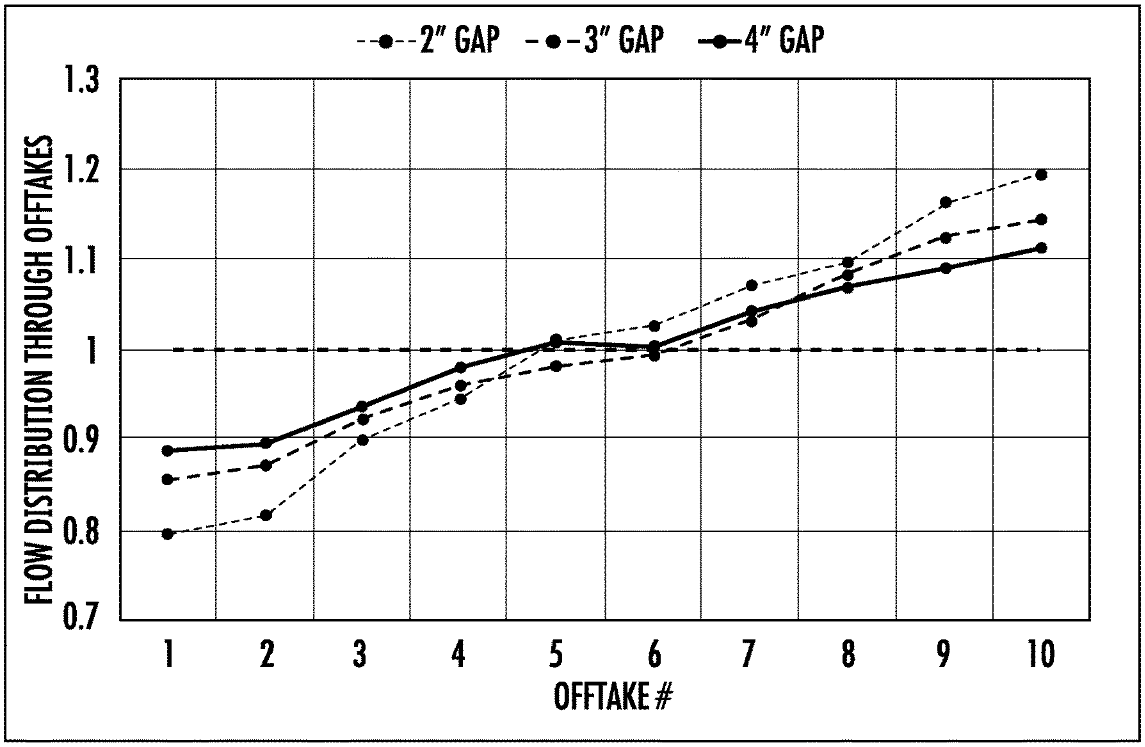
FIG. 3C is a chart illustrating the effect on flow distribution through shuttle exhaust shafts by increasing the size of an entrainment gap between exhaust shafts of the shuttle and flue risers of the kiln housing.

FIG. 3C is a chart illustrating the effect on flow distribution through shuttle exhaust shafts 140 by increasing the size of an entrainment gap 142 between exhaust shafts 140 of the shuttle 104 and flue risers 122 of the kiln housing 102. In this chart, flow is normalized such that in an ideal scenario the flow through each exhaust shaft 140 is 1. In this way, a value of 1.1 means 10% more exhaust shaft flow than the expected flow rate. As an example, for a 2" gap, the flow is 20% lower for exhaust shaft #1, and 20% higher for exhaust shaft #10 (with gradual increases therebetween).

As shown, as the entrainment gap 142 increases, the flow distribution from each of the exhaust shafts 140 (i.e., offtakes) becomes more uniform. Increasing the entrainment gap 142 reduces the transfer of exhaust fan pressure to the exhaust shafts 140, thereby increasing the uniformity through the exhaust shafts 140. As a result, for a 4" gap, the flow rates are 12% lower for exhaust shaft #1 and 12% higher for exhaust shaft #10.

Figure 3D:
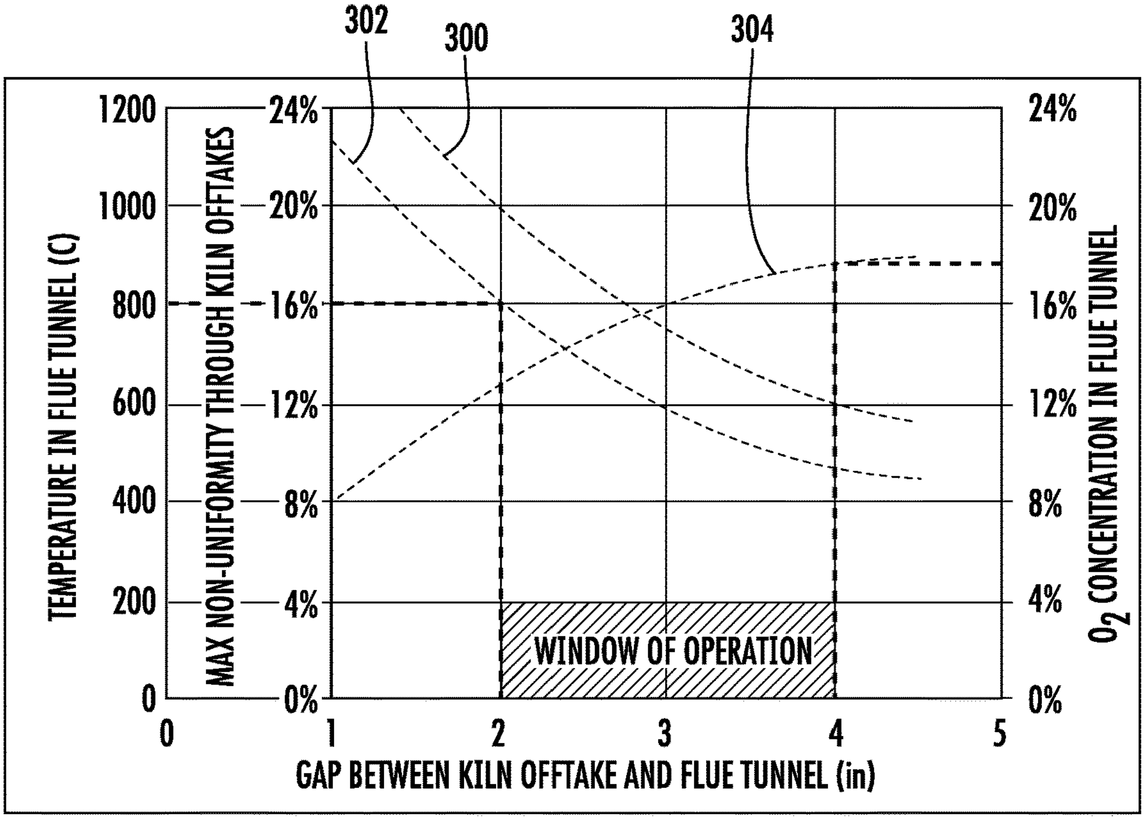
FIG. 3D is a chart illustrating the effects of increasing the size of an entrainment gap between exhaust shafts of the shuttle and flue risers of the kiln housing on max non-uniformity through the exhaust shafts, flue tunnel temperature, and flue tunnel oxygen concentration.

FIG. 3D is a chart illustrating the effects of increasing the size of an entrainment gap 142 between exhaust shafts 140 of the shuttle 104 and flue risers 122 of the kiln housing 102 on maximum non-uniformity of exhaust shaft 140 gas flow, flue tunnel temperature, and flue tunnel oxygen concentration. As shown, increasing the entrainment gap 142 decreases maximum non-uniformity 300 of gas flow through exhaust shafts 140 and temperature 302 in flue channel 124, but increases oxygen concentration 304 in flue channel 124. In certain embodiments, the operating temperature 302 of the exhaust fan 126 must not be above 800° C., which means that the entrainment gap must be at least 2". In certain embodiments, the oxygen concentration 304 must be below 18% to maintain solvent concentrations within safe lower flammable limits, which means that the entrainment gap must be less than 4". As a result, a maximum entrainment gap 142 of 4" may be used to maximize flow uniformity through the flue risers 122 and within the flue channel 124, or a minimum gap of 2" may be used to minimize the load on the exhaust fan 126. However, varying the volume of the exhaust shafts 140, varying the volume of the flue risers 122 (e.g., as a function of height, cross-sectional area (e.g., width), and/or varying the depth of the entrainment gap 142, individually or in combination), enables attainment of an optimized solution to provide flow uniformity without undue load on the exhaust fan 126.

Figure 4:
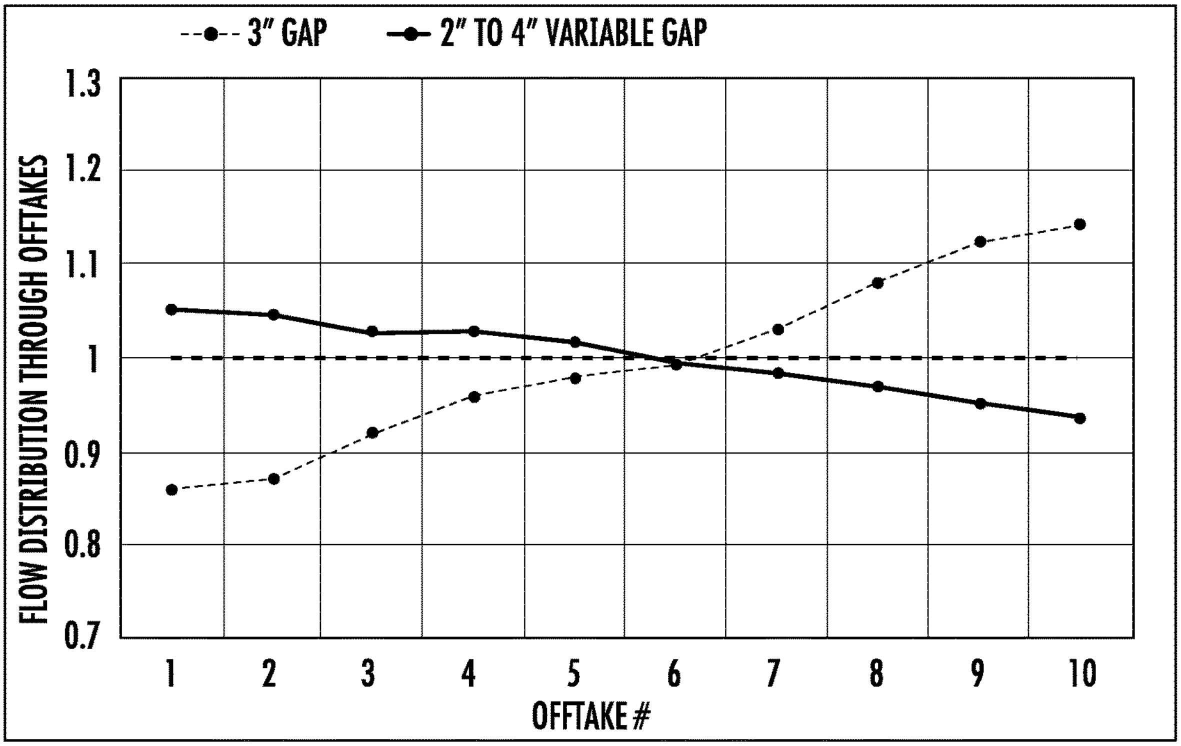
FIG. 4 is a chart depicting flow distribution through offtakes as a function of offtake number, illustrating increased flow uniformity through shuttle exhaust shafts with differently-sized entrainment gaps.

FIG. 4 is a chart depicting flow distribution through offtakes (i.e., exhaust shafts 140) as a function of offtake number, illustrating increased flow uniformity through shuttle exhaust shafts 140 with entrainment gaps 142 of different sizes. As shown, the presence of differently-sized entrainment gaps 142 provides more uniform flow in comparison to a uniform 3" entrainment gap 142. Further, providing differently-sized entrainment gaps 142 increases efficiency while operating within safety limits.

Figure 5:
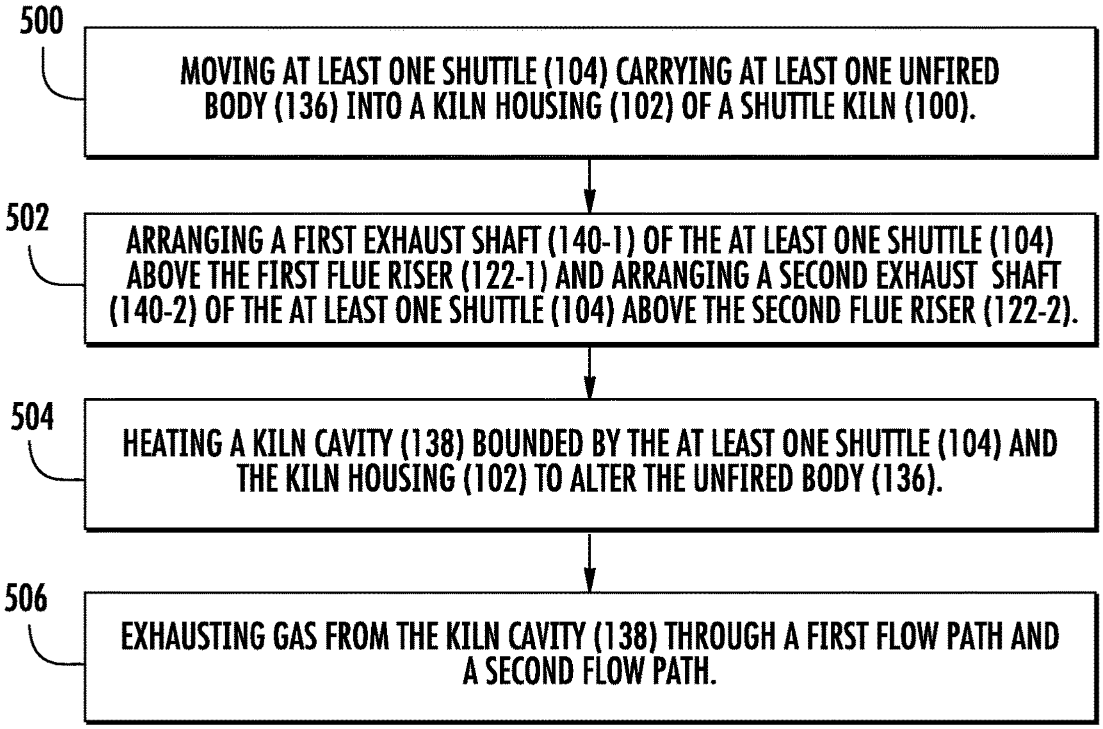
FIG. 5 is a flowchart identifying steps of a method of fabricating at least one fired body.

FIG. 5 is a flowchart identifying steps of a method of fabricating at least one fired body 136. According to step 500, at least one shuttle 104 carrying at least one unfired body 136 is moved into a kiln housing 102 of a shuttle kiln 100. The kiln housing 102 includes a first flue riser 122-1 and a second flue riser 122-2. According to step 502, a first exhaust shaft 140-1 of the at least one shuttle 104 is arranged above the first flue riser 122-1 and a second exhaust shaft 140-2 of the at least one shuttle 104 is arranged above the second flue riser 122-2. A sum of a first riser volume of the first flue riser 122-1 and a first shaft volume of the first exhaust shaft 140-1 is greater than a sum of a second riser volume of the second flue riser 122-2 and a second shaft volume of the second exhaust shaft 140-2.

According to step 504, a kiln cavity 138 bounded by the at least one shuttle 104 and the kiln housing 102 is heated to alter the at least one unfired body 136. According to step 506, gas from the kiln cavity 138 is exhausted through a first flow path and a second flow path. The first flow path extends through the first exhaust shaft 140-1, across a first entrainment gap 142-1, and through the first flue riser 122-1 to a first flue channel 124. The second flow path extends through the second exhaust shaft 140-2, across a second entrainment gap 142-2, and through the second flue riser 122-2 to the first flue channel 124.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A shuttle kiln, comprising:

a kiln housing comprising a first flue channel and a first plurality of flue risers in fluid communication with the first flue channel, the first plurality of flue risers comprising a first flue riser defining a first riser volume and a second flue riser defining a second riser volume;

at least one shuttle positioned within the kiln housing and defining a first plurality of exhaust shafts comprising a first exhaust shaft defining a first shaft volume and a second exhaust shaft defining a second shaft volume, the first exhaust shaft arranged above and in fluid communication with the first flue riser and separated therefrom by a first entrainment gap, the second exhaust shaft arranged above and in fluid communication with the second flue riser and separated therefrom by a second entrainment gap; and wherein a sum of the first riser volume and the first shaft volume is less than a sum of the second riser volume and the second shaft volume and the first entrainment gap is larger than the second entrainment gap.

2. The shuttle kiln of claim 1, wherein:

the kiln housing comprises a floor, a door, sidewalls, and a ceiling bounding an interior;

the first flue channel is arranged below a top surface of the floor; and the first plurality of flue risers extend above the top surface of the floor.

3. The shuttle kiln of claim 2, wherein:

the kiln housing further comprises a second flue channel and a second plurality of flue risers in fluid communication with the second flue channel.

4. The shuttle kiln of claim 1, wherein:

the kiln housing further comprises an exhaust fan in fluid communication with the first flue channel; and the first flue riser is closer than the second flue riser to the exhaust fan.

5. The shuttle kiln of claim 1, wherein the at least one shuttle comprises a plurality of shuttles.

6. The shuttle kiln of claim 5, wherein a first shuttle of the plurality of shuttles comprises the first exhaust shaft, and a second shuttle of the plurality of shuttles comprises the second exhaust shaft.

7. The shuttle kiln of claim 1, wherein:

the first plurality of flue risers further comprises a third flue riser defining a third riser volume;

the first plurality of exhaust shafts further comprises a third exhaust shaft defining a third shaft volume;

the third exhaust shaft is arranged above and in fluid communication with the third flue riser and separated from the third flue riser by a third entrainment gap; and a sum of the second riser volume and the second shaft volume is less than a sum of the third riser volume and the third shaft volume.

8. The shuttle kiln of claim 7, wherein the kiln housing further comprises an exhaust fan in fluid communication with the first flue channel, the first flue riser is closer than the second flue riser to the exhaust fan, and the second flue riser is positioned between the first flue riser and the third flue riser.

9. The shuttle kiln of claim 8, wherein the second entrainment gap is larger than the third entrainment gap.

10. The shuttle kiln of claim 1, wherein:

at least a portion of the first exhaust shaft is vertically aligned with the first flue riser; and at least a portion of the second exhaust shaft is vertically aligned with the second flue riser.

11. The shuttle kiln of claim 1, wherein:

a cross-sectional area of the first flue riser is in a range of from 0.09 $m^2$ to 0.21 $m^2$; and a cross-sectional area of the first exhaust shaft is in a range of from 0.09 $m^2$ to 0.21 $m^2$.

12. The shuttle kiln of claim 1, wherein a height of the first flue riser is less than a height of the second flue riser.

13. The shuttle kiln of claim 1, wherein a height of the first exhaust shaft is less than a height of the second exhaust shaft.

14. The shuttle kiln of claim 1, wherein:

a height of the first flue riser is less than a height of the second flue riser; and a height of the first exhaust shaft is less than a height of the second exhaust shaft.

15. The shuttle kiln of claim 1, wherein a cross-sectional area of the first flue riser is less than a cross-sectional area of the second flue riser.

16. The shuttle kiln of claim 1, wherein a cross-sectional area of the first exhaust shaft is less than a cross-sectional area of the second exhaust shaft.

17. The shuttle kiln of claim 1, wherein a cross-sectional area of the first flue riser is less than a cross-sectional area of the second flue riser and a cross-sectional area of the first exhaust shaft is less than a cross-sectional area of the second exhaust shaft.

18. A shuttle kiln, comprising:

a kiln housing comprising a flue channel and a plurality of flue risers in fluidic communication with the flue channel, the plurality of flue risers comprising a first flue riser defining a first riser volume and configured to be arranged below a first exhaust shaft of a shuttle when the shuttle is positioned within the kiln housing, and a second flue riser defining a second riser volume that differs from the first riser volume, the second flue riser configured to be arranged below a second exhaust shaft of the shuttle when the shuttle is positioned within the kiln housing; and when the shuttle is positioned within the kiln housing, the first flue riser is separated from the first exhaust shaft by a first entrainment gap and the second flue riser is separated from the second exhaust shaft by a second entrainment gap that differs in size from the first entrainment gap.

19. A shuttle kiln, comprising:

at least one shuttle configured to be removably positioned within a kiln housing, the at least one shuttle defining a plurality of exhaust shafts comprising a first exhaust shaft defining a first shaft volume and a second exhaust shaft defining a second shaft volume that differs from the first shaft volume, the first exhaust shaft configured to be arranged above a first flue riser of the kiln housing and separated therefrom by a first entrainment gap when the at least one shuttle is positioned within the kiln housing, the second exhaust shaft configured to be arranged above a second flue riser of the kiln housing and separated therefrom by a second entrainment gap that differs in size from the first entrainment gap when the at least one shuttle is positioned within the kiln housing.

* * * * *